(12) United States Patent
Ives

(10) Patent No.: US 11,054,395 B2
(45) Date of Patent: Jul. 6, 2021

(54) INDUCTIVE SENSOR DEVICE WITH REFERENCE SENSOR

(71) Applicant: Raytheon Company, Waltham, MA (US)

(72) Inventor: Philip H. Ives, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 266 days.

(21) Appl. No.: 15/914,037

(22) Filed: Mar. 7, 2018

(65) Prior Publication Data

US 2019/0277803 A1    Sep. 12, 2019

(51) Int. Cl.

| | |
|---|---|
| *G01N 27/90* | (2021.01) |
| *G01B 7/14* | (2006.01) |
| *G01V 3/10* | (2006.01) |
| *G01D 5/22* | (2006.01) |
| *G01D 5/243* | (2006.01) |

(Continued)

(52) U.S. Cl.
CPC ............... *G01N 27/90* (2013.01); *G01B 7/14* (2013.01); *G01D 5/2006* (2013.01); *G01D 5/2013* (2013.01); *G01D 5/2275* (2013.01); *G01D 5/243* (2013.01); *G01D 5/24452* (2013.01); *G01V 3/10* (2013.01)

(58) Field of Classification Search
CPC .... G01N 27/90; G01D 5/2013; G01D 5/2006; G01D 5/24452; G01D 5/243; G01D 5/2275; G01V 3/10; G01B 7/14
USPC ........................................ 324/207.12; 702/94
See application file for complete search history.

(56) References Cited

U.S. PATENT DOCUMENTS

| | | | |
|---|---|---|---|
| 4,816,759 A | 3/1989 | Ames et al. | |
| 5,477,473 A | 12/1995 | Mandl et al. | |
| 5,528,446 A | 6/1996 | Sankaran | |

(Continued)

FOREIGN PATENT DOCUMENTS

| | | |
|---|---|---|
| CN | 105547126 | 5/2016 |
| EP | 2475964 | 7/2012 |

OTHER PUBLICATIONS

Co-pending U.S. Appl. No. 15/864,097, filed Jan. 8, 2018.

(Continued)

*Primary Examiner* — Farhana A Hoque

(74) *Attorney, Agent, or Firm* — Renner, Otto, Boisselle & Sklar, LLP

(57) ABSTRACT

An inductive sensor device includes a reference sensor head that is used to adjust the characteristics of an operational sensor head that is used to detect movement of a conductive target. The reference sensor head has near it a fixed reference target that is similar to the target for which the operational sensor head detects movement, with the difference that the reference target is fixed with respect to a reference sensor coil of the reference sensor head. The reference sensor head includes a variable reference capacitor or variable reference inductor that is adjusted to maintain constant (or nearly constant) output, such as a constant (or nearly constant) resonant frequency, during operation of the sensor device. Adjustments of the variable reference element (variable capacitor or variable inductor) may be undertaken to compensate for changes in characteristics of the reference sensor due to changes in temperature, for example.

18 Claims, 3 Drawing Sheets

(51) Int. Cl.
*G01D 5/244* (2006.01)
*G01D 5/20* (2006.01)

(56) References Cited

U.S. PATENT DOCUMENTS

| | | | |
|---|---|---|---|
| 5,594,344 | A | 1/1997 | Doyle |
| 5,854,553 | A | 12/1998 | Barclay et al. |
| 5,886,519 | A | 3/1999 | Masreliez et al. |
| 6,148,669 | A | 11/2000 | Roest |
| 6,664,782 | B2 | 12/2003 | Slates |
| 6,803,757 | B2 | 10/2004 | Slates |
| 6,873,149 | B1 | 3/2005 | Hoyte et al. |
| 7,324,908 | B2 | 1/2008 | Browning et al. |
| 7,358,720 | B1 | 4/2008 | Maier |
| 8,198,888 | B2 | 6/2012 | Groemmer et al. |
| 8,542,008 | B2 | 9/2013 | Nakano et al. |
| 8,564,281 | B2 * | 10/2013 | Filatov ............... F16C 32/0446 324/207.2 |
| 9,459,369 | B2 | 10/2016 | Roach et al. |
| 2005/0046593 | A1 | 3/2005 | Tulpule |
| 2007/0024274 | A1 | 2/2007 | Riedel et al. |
| 2009/0140728 | A1 | 6/2009 | Rollins et al. |
| 2011/0057668 | A1 | 3/2011 | Chen |
| 2013/0249452 | A1 | 9/2013 | Shinohara |
| 2013/0271158 | A1 | 10/2013 | Thoss et al. |
| 2014/0157897 | A1 * | 6/2014 | Anagnost ............. G01P 15/132 73/514.35 |
| 2014/0182395 | A1 | 7/2014 | Brandl |
| 2014/0300425 | A1 | 10/2014 | Cazzaniga et al. |
| 2015/0190659 | A1 | 7/2015 | Köhler |
| 2015/0362340 | A1 | 12/2015 | Montagne |
| 2016/0025519 | A1 | 1/2016 | Brunner |
| 2016/0169717 | A1 * | 6/2016 | Zhitomirsky ........... G01D 5/20 702/94 |
| 2016/0238412 | A1 | 8/2016 | Germann et al. |
| 2017/0234945 | A1 | 8/2017 | Findeklee |
| 2017/0319097 | A1 | 11/2017 | Amthor |

OTHER PUBLICATIONS

Co-pending U.S. Appl. No. 16/056,916, filed Aug. 7, 2018.
International Search Report and Written Opinion for International Application No. PCT/US2018/051689 dated Jan. 7, 2019.
International Search Report and Written Opinion for corresponding International Application No. PCT/US2018/060618 dated Feb. 19, 2019.

* cited by examiner

INDUCTIVE SENSOR DEVICE WITH REFERENCE SENSOR

FIELD OF THE INVENTION

The invention is in the field of inductive sensors, such as eddy current displacement sensors.

DESCRIPTION OF THE RELATED ART

In eddy current displacement sensors, analog drive circuits are used to provide an oscillating magnetic field to sensor coils (heads), which are parts of a sensor network. The drive circuits provide an oscillating magnetic field to drive the sensor coils, typically with a frequency of about 500 kHz. The sensor network detects changes in the sensor head impedance due to the proximity of a target to the sensor head. These impedance changes are proportional to distance from target to sensor heads. The output of the sensor network is a sinusoid that must be demodulated and/or processed to determine amplitude and/or phase from which position can be determined, for example to extract position information from the signal amplitude, or alternatively processed to extract phase from the signal which also is proportional to position. Continued improvements in accuracy of such sensors is desirable.

SUMMARY OF THE INVENTION

An inductance sensor device includes a reference sensor head with a fixed target, used to tune an operational sensor head, for example to compensate for temperature effects.

An inductance sensor device has capacitors placed close to corresponding sensor heads or coils. The corresponding capacitors and coils may be placed on the same substrate.

An inductance sensor device has a four-wire (Kelvin) connection between an electronics module and a sensor head.

According to an aspect of the invention, a position sensor device includes: an operational sensor head for sensing movement of a movable target; and a reference sensor head operatively coupled to a fixed reference target; wherein output from the reference sensor head is configured to tune output from the operational sensor head.

According to an embodiment of any paragraph(s) of this summary, the operational sensor head includes a sensor coil and a variable electrical element operatively coupled to the sensor coil.

According to an embodiment of any paragraph(s) of this summary, the variable electrical element is a variable capacitor.

According to an embodiment of any paragraph(s) of this summary, the variable electrical element is a variable inductor.

According to an embodiment of any paragraph(s) of this summary, the reference sensor head includes a reference sensor coil and a variable reference capacitor operatively coupled to the reference sensor coil.

According to an embodiment of any paragraph(s) of this summary, the variable reference capacitor is adjusted to maintain resonant frequency of the reference sensor head.

According to an embodiment of any paragraph(s) of this summary, the variable reference capacitor is operatively coupled to the variable capacitor of the operational sensor head such that changes to capacitance of the variable reference capacitor are also made to the variable capacitor of the operational sensor head.

According to an embodiment of any paragraph(s) of this summary, the reference sensor head is part of a feedback loop that adjusts capacitance of the variable reference capacitor to maintain a resonant frequency of the reference sensor head.

According to an embodiment of any paragraph(s) of this summary, the feedback loop includes a phase calculation module that receives an output signal from the reference sensor head.

According to an embodiment of any paragraph(s) of this summary, the feedback loop includes a digital-to-analog converter that converts output from the phase calculation module to an analog signal sent to the variable reference capacitor.

According to an embodiment of any paragraph(s) of this summary, the operational sensor head also includes a fixed capacitor operatively coupled to the sensor coil and the variable capacitor.

According to an embodiment of any paragraph(s) of this summary, the operational sensor head includes a sensor coil and one or more capacitors; and the sensor coil and the one or more capacitors are on a substrate.

According to an embodiment of any paragraph(s) of this summary, the position sensor device further includes an electronics module that includes: an amplifier of the operational sensor head; an analog-to-digital converter coupled to operational sensor head, wherein the analog-to-digital converter digitizes an output signal from the amplifier to produce a digitized output signal; and a demodulator of the operational sensor that demodulates the digitized output signal.

According to an embodiment of any paragraph(s) of this summary, the operational sensor head includes one or more capacitors that are outside of the electronics module, and that are closer than the electronics module to a sensor coil of the operational sensor head.

According to an embodiment of any paragraph(s) of this summary, there is a four-wire connection between the sensor coil and the electronics module, with separate wires for providing a drive signal from the electronics module to the sensor coil, and for providing an output signal from the sensor coil to the electronics module.

According to another aspect of the invention, a method of operating a sensor head operatively coupled to a fixed-position target, includes the steps of: adjusting a reference sensor head of the sensor device to maintain a consistent output from the reference sensor head; and adjusting an operational sensor head of the sensor device using results from the adjusting of the reference sensor head, wherein the operational sensor head is used to determine position of a movable target.

According to an embodiment of any paragraph(s) of this summary, adjusting of the reference sensor head includes adjusting capacitance of a variable reference capacitor of the reference sensor head.

According to an embodiment of any paragraph(s) of this summary, adjusting of the operational sensor head includes adjusting capacitance of a variable capacitor of the operational sensor head based on the adjusting of the variable reference capacitor.

According to an embodiment of any paragraph(s) of this summary, adjusting of the reference sensor head includes adjusting capacitance or inductance of a variable reference electrical element of the reference sensor head.

According to an embodiment of any paragraph(s) of this summary, adjusting of the operational sensor head includes adjusting capacitance or inductance of a variable electrical element of the operational sensor head based on the adjusting of the variable reference electrical element.

According to an embodiment of any paragraph(s) of this summary, adjusting of the reference sensor head is part of a closed-loop feedback process.

According to an embodiment of any paragraph(s) of this summary, adjusting of the reference sensor head maintains a phase of an output signal from a reference sensor coil of the reference sensor head.

According to an embodiment of any paragraph(s) of this summary, adjusting of the reference sensor head and adjusting of the operational sensor head compensate for changes in characteristics of the sensor device due to changes in temperature.

According to an embodiment of any paragraph(s) of this summary, the reference sensor head has a reference sensor coil that inductively interacts with the fixed-position target; and According to an embodiment of any paragraph(s) of this summary, the operational sensor head has a sensor coil that inductively interacts with the movable target.

According to still another aspect of the invention, a position sensor device includes: an operational sensor head for inductively sensing movement of a movable target; wherein the operational sensor head includes a sensor coil and a capacitor operatively coupled to the sensor coil; and wherein the sensor coil and the capacitor are on a substrate that is part of the operational sensor head.

According to an embodiment of any paragraph(s) of this summary, the capacitor is outside of the electronics module, and is closer than the electronics module to the sensor coil.

According to an embodiment of any paragraph(s) of this summary, there is a four-wire connection between the sensor coil and the electronics module, with separate wires for providing a drive signal from the electronics module to the sensor coil, and for providing an output signal from the sensor coil to the electronics module.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings show various aspects of the invention.

DETAILED DESCRIPTION

An inductive sensor device includes a reference sensor head that is used to adjust the characteristics of an operational sensor head that is used to detect movement of a conductive target. The reference sensor head is near a fixed reference target that is similar to the target for which the operational sensor head detects movement, with the difference that the reference target is in a fixed position with respect to the reference sensor head. The reference sensor head includes a variable reference capacitor or variable reference inductor that is adjusted to maintain constant (or nearly constant) output, such as a constant (or nearly constant) resonant frequency, during operation of the sensor device. Adjustments of the variable reference element (variable capacitor or variable inductor) may be undertaken to compensate for changes in characteristics of the reference sensor head due to changes in temperature, for example. The reference sensor head and the operational sensor head may be coupled together so that adjustments are made in a variable operational element (variable capacitor or variable inductor) of the operational sensor head, similar to those adjustments made to the variable reference element. The reference sensor head may be used to provide adjustments to multiple operational sensor heads.

In another aspect an inductive sensor device has capacitors placed close to sensor coils, as opposed to in a relatively distant electronics module. For example each sensor head of the device may contain one or more substrates, with for instance a sensor coil and one or more corresponding capacitors on the substrate(s).

In still another aspect an inductive sensor device may have, for each of its sensor heads, different wires for the driving signal sent to the sensor coil, and for the sensed output signal to be processed for detecting position of a movable target. This may allow use of a very high impedance sense amplifier, which may improve sensitivity and/or accuracy of the device.

Figure 1:
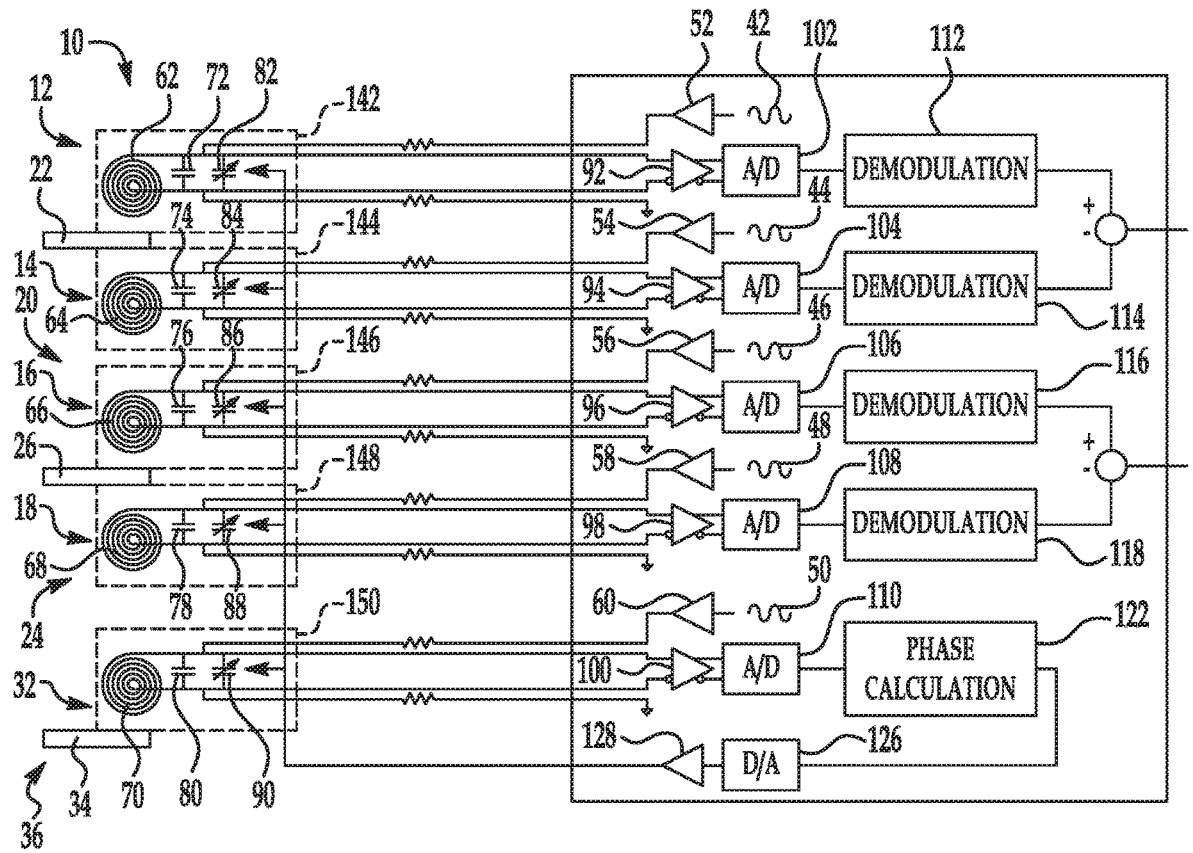
FIG. 1 is a block diagram of an impedance-based sensing device according to a first embodiment of the invention.

FIG. 1 is a schematic diagram of an inductive sensor device 10, such as an eddy current sensor device for measuring changes in location of one or more targets. The device 10 includes four operational (or active) sensor heads 12, 14, 16, and 18. The operational sensor heads 12 and 14 are used as parts of a first sensor channel 20 for determining position of a first movable target 22, and the operational sensor heads 16 and 18 are used as parts of a second sensor channel 24 for determining position of a second movable target 26. In one embodiment the targets 22 and 26 may be associated with movements of an optical device such as a mirror, with the targets 22 and 26 for example representing movement of the mirror (e.g., translational or tilting movements) in orthogonal directions. This is only one example of targets for which movement may be determined, and it will be appreciated that many other uses for inductive sensors are possible, for example for use as part of an accelerometer. The targets 22 and 26 may be made of aluminum or another suitable material, and may have any of a variety of suitable shapes, such as being plates, bars, or disks.

The device 10 also includes a reference sensor head 32 that has a fixed reference target 34 associated with it, as parts of a reference channel 36. The reference target 34 does not move relative to the reference sensor head 32, allowing the output of the reference sensor head 32 to be used to adjust the characteristics of the active or operational sensor heads 12-18, for example to compensate for effects of changes of temperature. The reference target 34 may be made of the same material as the targets 22 and 26, and/or may have the same shape as the targets 22 and 26.

One or more current drives apply a periodic drive current to the sensor heads 12, 14, 16, 18, and 32. This current is indicated in FIG. 1 by waveforms 42, 44, 46, 48, and 50, which pass through respective current drive amplifiers 52, 54, 56, 58, and 60, on the way to respective sensor coils 62, 64, 66, 68, and 70. The drive current may be at a suitable frequency, for example at 500 kHz, producing oscillating magnetic fields in the sensor coils 62-70. The sensor coils 62-70 may be wound wire coils or flat spiral traces on a printed wiring board, to give non-limiting examples. The sensor heads 12, 14, 16, 18, and 32 also have respective fixed capacitors 72, 74, 76, 78, and 80, and respective variable capacitors 82, 84, 86, 88, and 90 that are coupled in parallel with the corresponding respective sensor coils 62, 64, 66, 68, and 70.

The variable capacitors 82-90 are examples of a broader category of variable electrical elements. Other types of variable electrical elements, such as variable inductors, may be substituted for the variable capacitors 82-90 shown in the specific embodiment depicted in FIG. 1, with types of elements (such as variable inductors) placed in series with the coils 62-70 instead of in parallel with the capacitors 82-90. In the following description it should be understood that the variable capacitors 82-90 described are mere examples of the broader class of variable electrical elements that can be employed.

Output signals from the sensor heads 12, 14, 16, 18, and 32 are passed through respective sensing instrumentation amplifiers 92, 94, 96, 98, and 100, and then through respective analog-to-digital (A/D) converters 102, 104, 106, 108, and 110. The digitized signals from the operational sensor channels 20 and 24 are then passed through demodulators 112, 114, 116, and 118, and the demodulated output signals are then combined to produce position indications regarding the positions of the targets 22 and 26. Demodulation can take the form of phase sensitive rectification, or DFT (Discrete Fourier Transform), or other means. Target position can be extracted from either amplitude or phase measurements When the distance changes between a given target 22, 26 and its associated sensor coils 62, 64 and 66, 68, the eddy currents through the inductor coils 62, 64 and 66, 68 are affected in such a way as to change the effective inductance of the coil, thus shifting the resonance and allowing a means by which to measure position. The change in either amplitude or phase of the output signal of the sensor heads 12, 14, 16, and 18 can be used to estimate target position, using the processed signal alone or combined with other data (such as calibration data or a look-up table, or applying a linear least squares fit (or higher order curve) to the data) to produce an output of the object displacement detected by the sensor heads 12, 14, 16, 18 of a given channel 20, 24. For example, a sensor channel 20, 24 may be calibrated by moving the target position to known positions and comparing the sensor estimated target position to these known positions. The differences between the estimated position and known positions can then be used within the device 10 to reduce estimated position error via lookup table, or polynomial fit or other means.

The digitized reference output signal of the reference sensor head 32 is passed through a phase calculation module 122 in which changes in phase are detected, indicating changes in resonant frequency. Phase may be detected through multiple means or mechanisms, such as (for example) a Discrete Fourier Transform (DFT). Since the reference target 34 does not move, any changes in the output reference signal are due to changes in characteristics of the reference channel 36. Use of the reference channel 36 allows isolation of such changes in system characteristics, for example caused by changes in temperature, keeping such changes separate from changes in output resulting from movement of targets. This allows for compensation of the system, through the use of the variable capacitors 82, 84, 86, 88, and 90, to remove or at least greatly reduce the changes of system characteristics, such as those resulting from changes in temperature.

Accordingly, output from the phase calculation module 122 is expressed as a signal to change the value of the capacitance of the variable reference capacitor 90, with the value changed so as to compensate for the changes in phase to the output of the reference sensor head 32, to maintain the resonant frequency of the reference sensor head 32. This signal for a value change is passed through a digital-to-analog (D/A) converter 126, and through a reference channel feedback amplifier 128, before being sent on to the variable capacitors 82, 84, 86, 88, and 90, to implement the capacitance adjustment. In essence the reference channel 36 acts as a low-bandwidth closed feedback loop, with the capacitance of the variable reference capacitor 90 adjusted to maintain the output signal from the reference channel 36 constant, and with the same change being made in the variable capacitors 82, 84, 86, and 88 of the operational sensor heads 12-18. An alternative approach would be to perform the reference calculation and corresponding adjustments on command, since the changes to be compensated for are slowly changing. Such calculations and operations may be performed in software, hardware, or firmware, or any combination thereof.

The feedback signals are described above as analog signals. Alternatively the feedback signals could be in the form of digital signals, with appropriate interfaces provided at the sensor heads.

The arrangement and characteristics of the reference sensor head 32 may be similar in many respects to the arrangement and characteristics of the operational sensor heads 12-18. For example, all of the fixed capacitors 72-80 may have similar characteristics; all of the variable capacitors 82-90 may have similar characteristics; all of the drive amplifiers 52-60 may have similar characteristics; all of the sensor coils 62-70 may have similar characteristics; all of the sensing instrumentation amplifiers 92-100 may have similar characteristics; and/or all of the A/D converters 102-110 may have similar characteristics. The similarity in characteristics between the various corresponding parts of the sensor device 10 aids in applying the tuning of the reference sensor head 32 to the operational sensor heads 12-18. However in some alternative embodiments there may be different characteristics for some parts of the different sensors, with appropriate adjustments for tuning made.

The variable capacitors 82-90 are one example of broader categories of variable electrical elements that may be adjusted to tune the sensor heads 12-18. Another possible type of variable electrical element is a variable inductor. Variable inductors may be provided as part of the sensor heads 12-18 and 32, electrically coupled to the coils 62-70, with the inductance of the variable inductors varied in order to tune the sensor heads 12-18 and 32. Different types of variable elements may be used in the same sensor heads, for example with variable capacitors and/or variable inductors employed.

One advantages feature of the sensor 10 is that the capacitors 72-90 may be located close to their corresponding sensor coils 62-70, away from an electronics module (or electronics box) 130 that houses other electrical/electronic/processing components of the sensor device 10. For instance the electronics module 130 may include the amplifiers 52-60, 92-100, and/or 128; the A/D converters 102-110; the D/A converter 126; the demodulators 112-118; and/or the phase calculation module 122.

As illustrated in FIG. 1, the sensor coils 62, 64, 66, 68, and 70 may be located on respective substrates 142, 144, 146, 148, and 150, with the capacitors 72-90 corresponding to each of the sensor coils 62, 64, 66, 68, and 70 also located on the corresponding substrates 142, 144, 146, 148, and 150. The placement of the capacitors 72-90 close to their corresponding sensor coils 62-70, with the capacitors 72-90 for instance closer to the sensor coils 62-70 than to the electronics module 130, also provides for easier and more accurate tuning of the sensor device, reducing the electrical resistance between the sensor coils 62-70, and the capacitors 72-90.

The placement of the capacitors 72-90 close to the corresponding sensor coils 62-70 enables another advantageous arrangement of the sensor device 10, the use of four-wire connections for each of the sensor heads 12-18 and 32. There are separate wires for the drive signals being sent from the drive amplifiers 52-60 to the sensor heads 12-18 and 32, and for the sensor signals being sent from the sensor heads 12-18 and 32 to the sensing instrumentation amplifiers 92-100. The elimination of lead and contact resistance from the sensor signal output improves accuracy of the signals used for determining position of the targets 22 and 26, and improves the accuracy of the sensor head tuning based on the reference sensor head 32.

Figure 2:
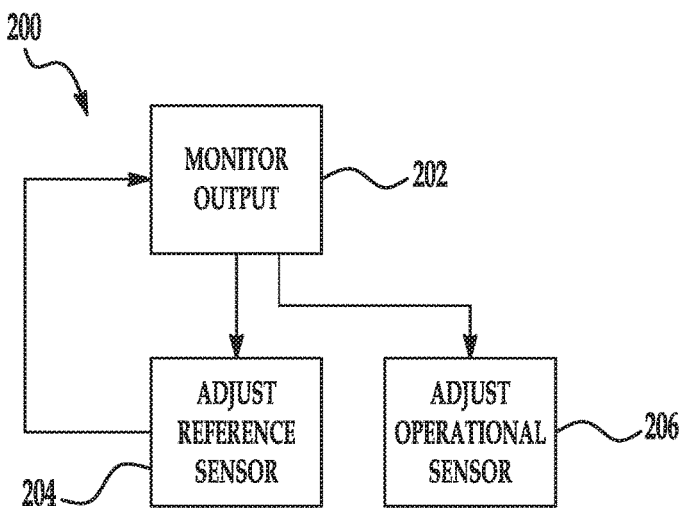
FIG. 2 is a high-level flow chart of a method according to an embodiment of the invention.

FIG. 2 shows a high-level flow chart for a method 200 for adjusting a sensor device, such as the device 10 (FIG. 1). In step 202 the output of the reference sensor head 32 (FIG. 1) is monitored, such as in by use of the phase calculation module 122 (FIG. 1). Based on this monitoring, in step 204 adjustments are made in the reference sensor head 32, such as in in the variable capacitor 90, to maintain the resonant frequency of the reference senor head 32. The steps 202 and 204 are parts of a feedback loop, as described in greater detail above. In step 206 the operational sensor heads 12-18 are tuned or adjusted based on the adjustments to the reference sensor head 32. As described earlier, these adjustments may involve identical adjustments to variable capacitors 82-90 of both the reference sensor head 32 and the operational sensor heads 12-18.

Figure 3:
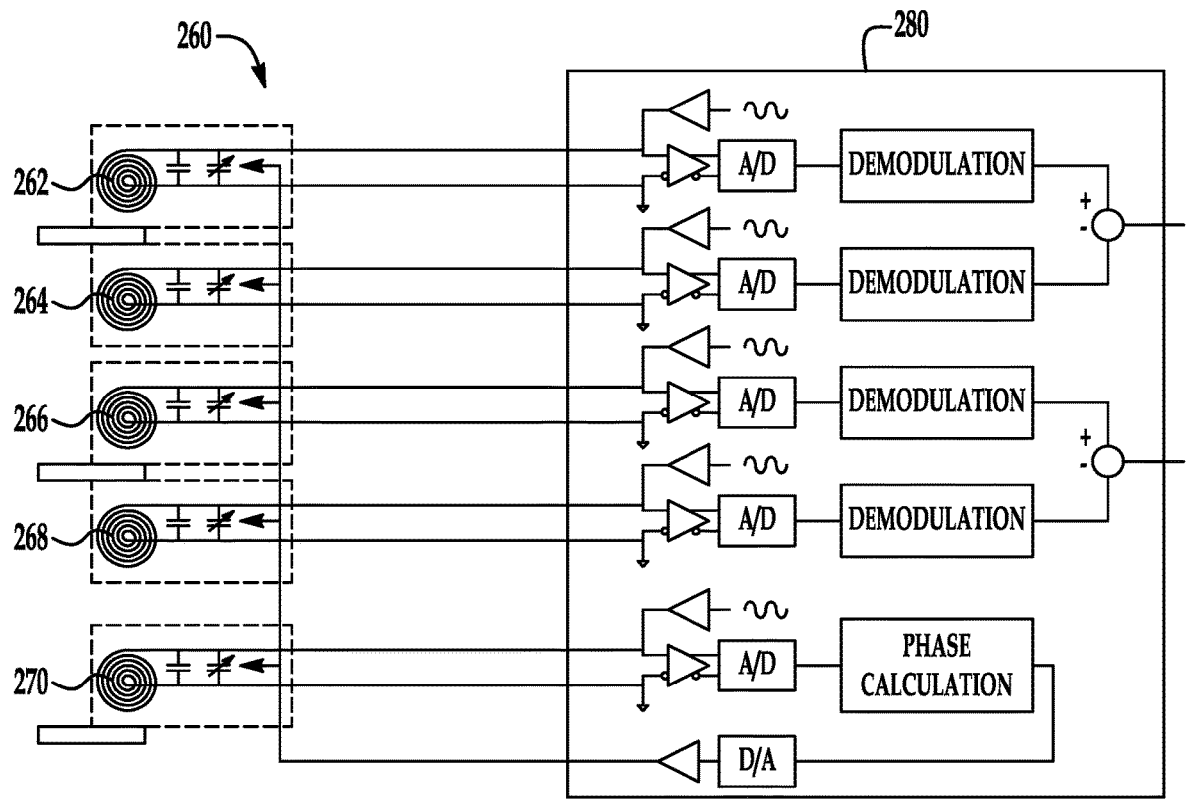
FIG. 3 is a block diagram of an impedance-based sensing device according to a second embodiment of the invention.

FIG. 3 shows an alternative configuration, a sensor device 260 that differs from the sensor device 10 (FIG. 1) in that the sensor device 260 has only two-wire connections, rather than the four-wire connections of the sensor device 10, with drive signals and sensor head output signals running along the same wires between sensor heads 262-270, and an electronics module (or electronics box) 280. In other respects the sensor device 260 is similar to the sensor device 10.

Figure 4:
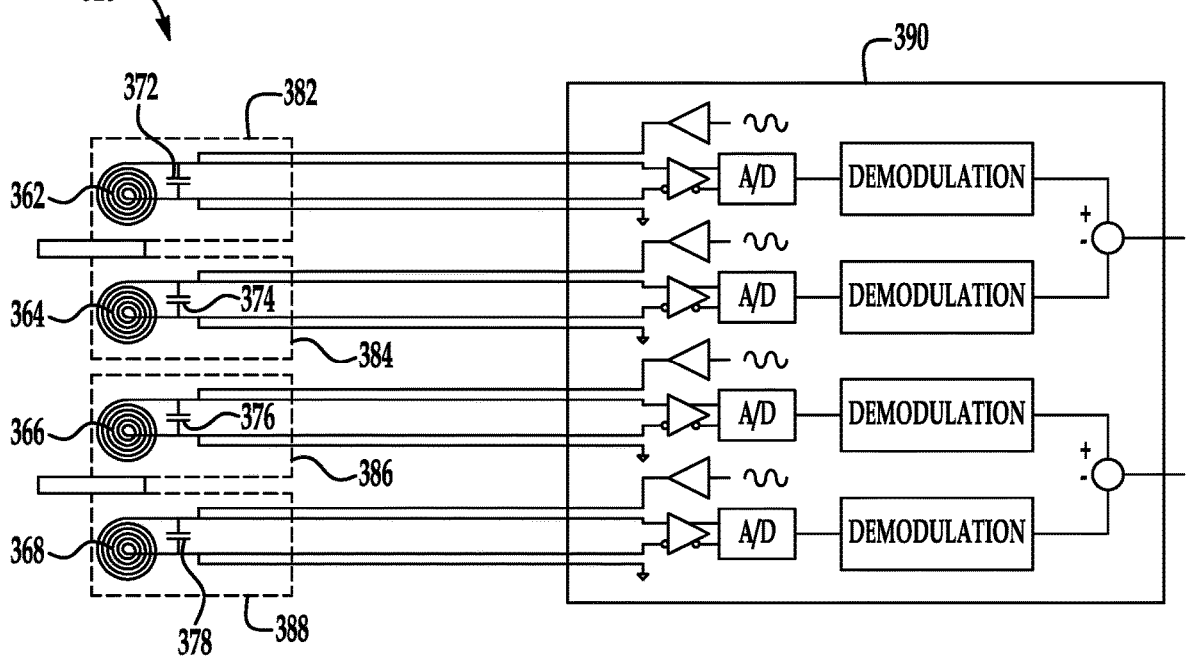
FIG. 4 is a block diagram of an impedance-based sensing device according to a third embodiment of the invention.

FIG. 4 shows another alternative, a sensor device 310 that dispenses with the reference channel 36 (FIG. 1) of the sensor device 10 (FIG. 1). Since the feedback concept of the sensor device 10 is dispensed with, the sensor device 310 also does not include any variable capacitors, such as the variable capacitors 82-90 (FIG. 1) of the sensor device 10. Nonetheless the sensor device 310 does have some advantageous characteristics, such as those resulting from placement of fixed capacitors 372, 374, 376, and 378 close to respective sensor coils 362, 364, 366, and 368, for example with corresponding capacitors 372-328 and the coils 362-368 on respective substrates 382, 384, 386, and 388. In addition the sensor device 310 may share the four-wire interface with the sensor device 10, with separate pairs of drive signal wires and sensor output signal wires between the sensor coils 362-368 and the electronics module or electronics box 390.

Figure 5:
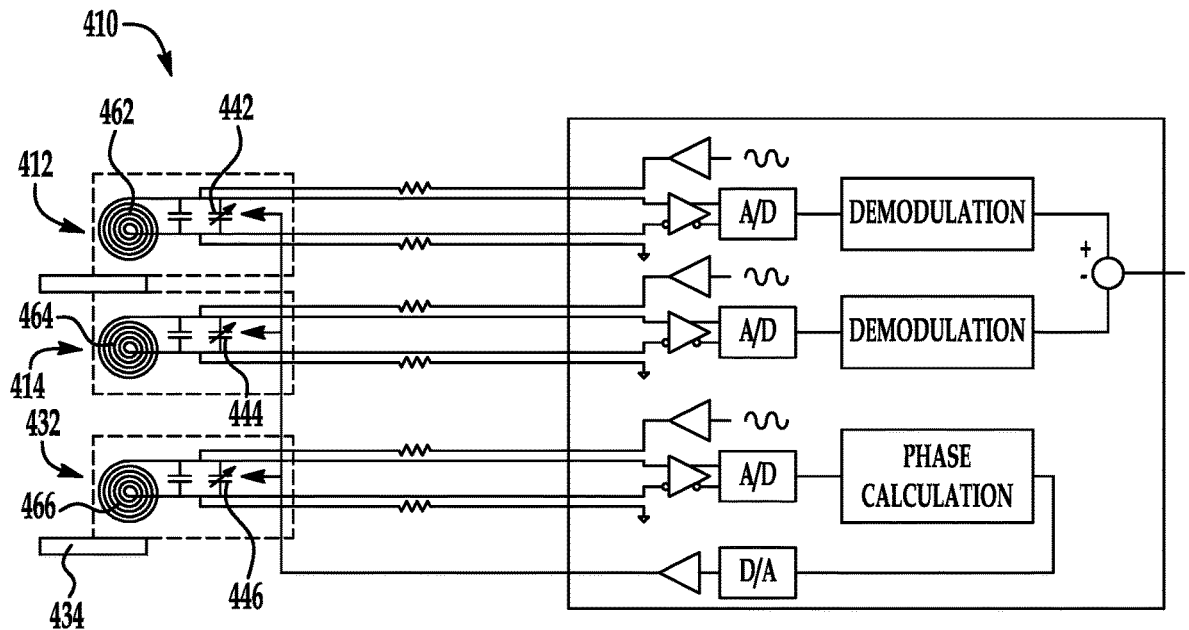
FIG. 5 is a block diagram of an impedance-based sensing device according to a fourth embodiment of the invention.

FIG. 5 shows still another alternative, a sensor device 410 with two operational sensor heads 412 and 414 to track movement of a single target 422, and a reference sensor head 432 operatively coupled to a fixed target 434 as part of a feedback loop. The reference sensor head 432 is used to compensate for temperature changes (or other effects) by varying variable capacitors 442, 444, and 446 that are operatively coupled to respective sensor coils 462, 464, and 466. The feedback process has been explained above with regard to the sensor device 10 (FIG. 1). The sensor device 410 differs from the sensor device 10 in that the sensor device 410 has only two operational sensor heads 412 and 414, as opposed to the four operational sensor heads 12-18 (FIG. 1) of the sensor device 10. It will be appreciated that any reasonable number of operational sensor heads may be in such a device, from a single operational sensor head to many such operational sensor heads.

Figure 6:
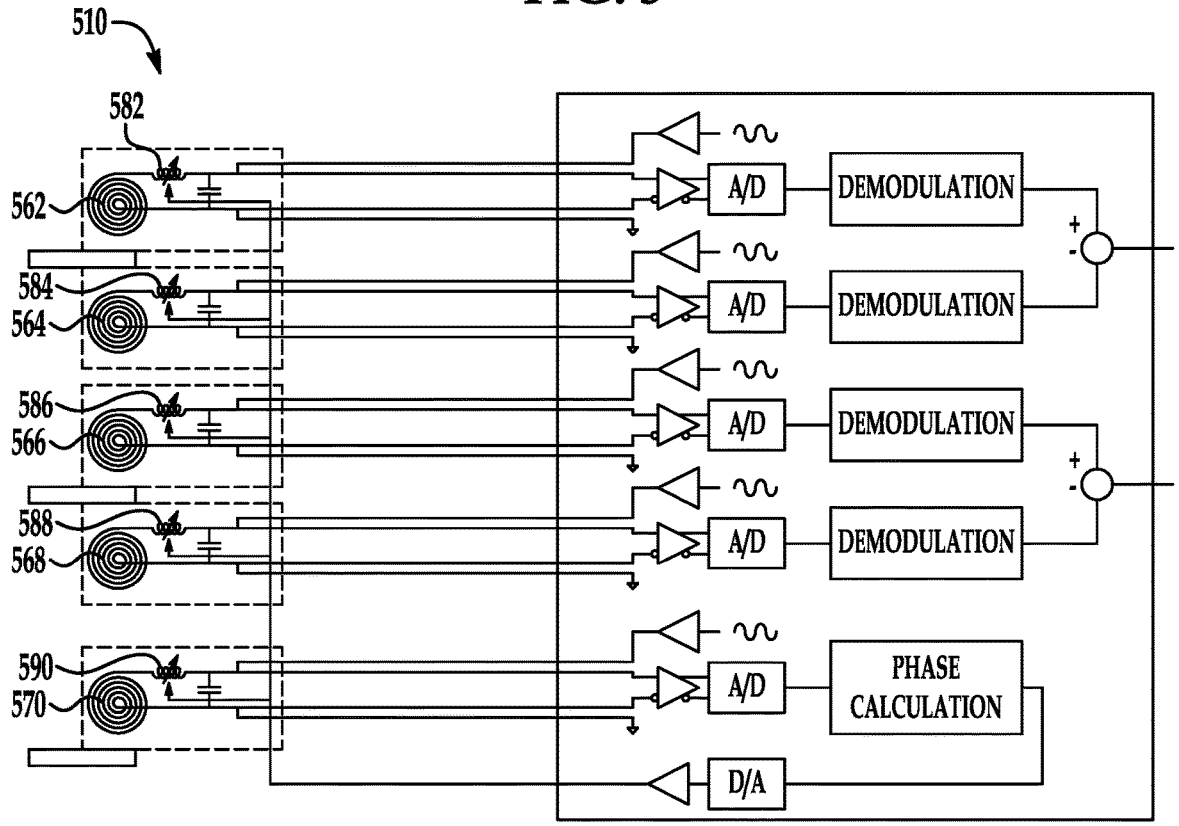
FIG. 6 is a block diagram of an impedance-based sensing device according to a fifth embodiment of the invention.

FIG. 6 shows a sensor device 510 which is similar to the sensor device 10 (FIG. 1) except that the variable capacitors 82-90 (FIG. 1) have been replaced by variable electrical elements 582, 584, 586, 588, and 590, which (as indicated earlier) may be variable capacitors, variable inductors, or some combination thereof. The variable electrical elements 582-590 are depicted in FIG. 6 as variable inductors in series with coils 562, 564, 566, 568, and 570, but could be more broadly other types of electrical elements. In other respects the sensor device 510 may be similar to the sensor device 10, having similar elements, similar features, and similar ways of functioning.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A position sensor device comprising:
   an operational sensor head for sensing movement of a movable target; and
   a reference sensor head operatively coupled to a fixed reference target;
   wherein output from the reference sensor head is configured to tune output from the operational sensor;
   further comprising an electronics module that includes:
      an amplifier of the operational sensor;
      an analog-to-digital converter coupled to an operational sensor head, wherein the analog-to-digital converter digitizes an output signal from the amplifier to produce a digitized output signal; and a demodulator of the operational sensor head that demodulates the digitized output signal; and wherein the operational sensor head includes one or more capacitors that are outside of the electronics module, and that are closer than the electronics module to a sensor coil of the operational sensor head.

2. The position sensor device of claim 1, wherein the operational sensor head includes a sensor coil and a variable electrical element operatively coupled to the sensor coil.

3. The position sensor device of claim 2, wherein the variable electrical element is a variable capacitor.

4. The position sensor device of claim 3,
wherein the reference sensor head includes a reference sensor coil and a variable reference capacitor operatively coupled to the reference sensor coil; and
wherein the variable reference capacitor is adjusted to maintain resonant frequency of the reference sensor head.

5. The position sensor device of claim 4, wherein the variable reference capacitor is operatively coupled to the variable capacitor of the operational sensor head such that changes to capacitance of the variable reference capacitor are also made to the variable capacitor of the operational sensor head.

6. The position sensor device of claim 3, wherein the reference sensor head is part of a feedback loop that adjusts capacitance of the variable reference capacitor to maintain a resonant frequency of the reference sensor head.

7. The position sensor device of claim 6, wherein the feedback loop includes:
a phase calculation module that receives an output signal from the reference sensor head; and
a digital-to-analog converter that converts output from the phase calculation module to an analog signal sent to the variable reference capacitor.

8. The position sensor device of claim 3, wherein the operational sensor head also includes a fixed capacitor operatively coupled to the sensor coil and the variable capacitor.

9. The position sensor device of claim 1,
wherein the operational sensor head includes a sensor coil and one or more capacitors; and
wherein the sensor coil and the one or more capacitors are on a substrate.

10. The position sensor device of claim 1, wherein there is a four-wire connection between the sensor coil and the electronics module, with separate wires for providing a drive signal from the electronics module to the sensor coil, and for providing an output signal from the sensor coil to the electronics module.

11. A method of operating a sensor head operatively coupled to a fixed-position target, the method comprising:
adjusting a reference sensor head of the sensor device to maintain a consistent output from the reference sensor head; and
adjusting an operational sensor head of the sensor device using results from the adjusting of the reference sensor head, wherein the operational sensor head is used to determine position of a movable target;
wherein adjusting of the reference sensor head includes adjusting capacitance or inductance of a variable reference electrical element of the reference sensor head; and
wherein adjusting of the operational sensor head includes adjusting capacitance or inductance of a variable electrical element of the operational sensor head based on the adjusting of the variable reference electrical element of the reference sensor head.

12. The method of claim 11, wherein adjusting of the reference sensor head is part of a closed-loop feedback process.

13. The method of claim 11, wherein adjusting of the reference sensor head maintains a phase of an output signal from a reference sensor coil of the reference sensor head.

14. The method of claim 11, wherein adjusting of the reference sensor head and adjusting of the operational sensor head compensate for changes in characteristics of the sensor device due to changes in temperature.

15. The method of claim 11,
wherein the reference sensor head has a reference sensor coil that inductively interacts with the fixed-position target; and
wherein the operational sensor head has a sensor coil that inductively interacts with the movable target.

16. A position sensor device comprising:
an operational sensor head for inductively sensing movement of a movable target;
wherein the operational sensor head includes a sensor coil and a capacitor operatively coupled to the sensor coil; and
wherein the sensor coil and the capacitor are on a substrate that is part of the operational sensor head; and
further comprising an electronics module that includes:
an amplifier of the operational sensor;
an analog-to-digital converter coupled to operational sensor head, wherein the analog-to-digital converter digitizes an output signal from the amplifier to produce a digitized output signal; and
a demodulator of the operational sensor head that demodulates the digitized output signal; and
wherein the capacitor is outside of the electronics module, and is closer than the electronics module to the sensor coil.

17. The position sensor device of claim 16, wherein there is a four-wire connection between the sensor coil and the electronics module, with separate wires for providing a drive signal from the electronics module to the sensor coil, and for providing an output signal from the sensor coil to the electronics module.

18. A position sensor device comprising:
an operational sensor head for sensing movement of a movable target; and
a reference sensor head operatively coupled to a fixed reference target;
wherein output from the reference sensor head is configured to tune output from the operational sensor;
wherein the operational sensor head includes a sensor coil and a variable electrical element operatively coupled to the sensor coil;
wherein the variable electrical element is a variable capacitor;
wherein the reference sensor head is part of a feedback loop that adjusts capacitance of the variable reference capacitor to maintain a resonant frequency of the reference sensor head; and
wherein the feedback loop includes:
a phase calculation module that receives an output signal from the reference sensor head; and
a digital-to-analog converter that converts output from the phase calculation module to an analog signal sent to the variable reference capacitor.

* * * * *